United States Patent [19]

Beauviala et al.

[11] 4,245,897
[45] Jan. 20, 1981

[54] MOVING PICTURE CAMERA WITH INTERCHANGEABLE FILM MAGAZINE

[75] Inventors: Jean-Pierre Beauviala, Grenoble; Jean-Pierre Charras, Bas Bernin, both of France

[73] Assignee: Societe AATON, Grenoble, France

[21] Appl. No.: 969,961

[22] Filed: Dec. 15, 1978

[30] Foreign Application Priority Data

Dec. 27, 1977 [FR] France ................................ 77 39318

[51] Int. Cl.³ .......................... G03B 1/22; G11B 15/34
[52] U.S. Cl. ...................................... 352/180; 352/14; 352/191; 242/75.51; 242/186; 242/183
[58] Field of Search ......................... 352/14, 170–172, 352/180–182, 166, 191–196, 184, 187; 242/75.51, 186, 190, 205, 183; 226/24, 42; 354/289, 217, 218

[56] References Cited

U.S. PATENT DOCUMENTS

| | | | |
|---|---|---|---|
| 2,906,584 | 9/1959 | Hammer et al. | 352/14 |
| 3,564,219 | 2/1971 | Mutziger | 242/186 |
| 3,819,258 | 6/1974 | Butler et al. | 352/182 X |
| 3,910,521 | 10/1975 | O'Callaghan et al. | 242/75.51 |
| 4,000,496 | 12/1976 | Beaulieu | 352/180 |
| 4,114,995 | 9/1978 | Stieringer et al. | 352/172 X |

*Primary Examiner*—L. T. Hix
*Assistant Examiner*—William B. Perkey
*Attorney, Agent, or Firm*—Oblon, Fisher, Spivak, McClelland & Maier

[57] ABSTRACT

A moving picture camera with interchangeable film magazine comprises in each magazine, a take-up roll on which is wound the exposed film, and an electric motor rotating this roll.

A measuring device is provided for measuring the speed of rotation of the take-up roll and for delivering a first signal representing this speed of rotation. A computer circuit receiving at its inputs said signal and a signal representing the image cadence selected and another signal representing the desired tension for the film, delivers at its ouptut a signal representing the value of the intensity of the electric current supplied to the motor, so that the required mechanical power, in other words the useful electric power supplied by this motor, is constant, for a selected image cadence and a desired film tension.

2 Claims, 3 Drawing Figures

MOVING PICTURE CAMERA WITH INTERCHANGEABLE FILM MAGAZINE

BACKGROUND OF THE INVENTION

The present invention relates to improvements in moving picture cameras with interchangeable film magazine.

Moving picture cameras are already known in which the energy necessary for rotating the drive friction of the take-up roll of the magazine is not taken from the main motor of the camera, but a motor housed in the magazine is used to this end, which delivers the energy necessary for winding the exposed film at a sufficient tension. Such is the case, for example, of high capacity moving picture cameras or ones which must operate at low temperatures.

In these known cameras, the electric motor incorporated in the magazine is not servo-controlled and it rotates at a sufficiently high speed to be able to drive the exposed film when the spool of film formed on the take-up roll has a small diameter, and with a sufficient torque to be able to drive this spool by creating a sufficient tension of the film when the spool formed has its maximum diameter. Consequently much more electrical energy than is necessary is consumed and this leads to a shortening of the useful life duration of the incorporated source of electric energy which is used in the camera.

SUMMARY OF THE INVENTION

It is a main object of the present invention to remedy this drawback by providing in the camera means for monitoring the value of the intensity of the current supplying the electric motor so that said latter delivers at any instant a constant useful electric power which is a function of the selected image cadence.

To this end, this moving picture camera with interchangeable film magazine comprises, in each magazine, a take-up roll on which is wound the exposed film, an electric motor rotating this roll, means for measuring the speed of rotation of the take-up roll and for delivering a first signal representing this speed of rotation, a multiplier circuit receiving at its two inputs respectively a second signal representing the image cadence selected and a third signal representing the desired tension for the film, this multiplier circuit producing at its output a fourth analog or digital signal corresponding to the product of the second and third signals and representing the mechanical power required as a function of the selected image cadence and of the desired tension of the film, and a divider circuit of which the dividend input is connected to the output of the multiplier circuit and of which the divisor input is connected to the output of the means emitting the first signal, this divider circuit dividing the fourth analog or digital signal representing the mechanical power required by the first signal representing the speed of rotation of the take-up roll so as to deliver at its output a fifth signal representing the value of the intensity of the electric current supplied to the motor, so that the required mechanical power, in other words the useful electric power supplied by this motor, is constant, for a selected image cadence and a desired film tension.

The invention consists in fact in that, at a given linear speed of the film and a given tension of the film necessary for the turns to be contiguous, once wound, the mechanical power required for the winding is equal to the product of this speed by the tension of the film and is therefore constant. Now, the speed is proportional to the image cadence which is selected by the operator and consequently the same applies to the mechanical power transmitted to the drive spindle. Now, this mechanical power is equal to the useful electric power supplied by the motor, i.e. to the product of the intensity of the supply current thereof by the speed of rotation of the motor. This results in that, by permanently measuring this speed of rotation, i.e. that of the take-up roll the current which must be sent into the electric motor for the useful electric power, in other words the mechanical power supplied to the drive spindle, to be maintained constant, for a selected image cadence, may be determined by the computer provided in the camera according to the invention.

The moving picture camera according to the invention offers the advantage that, at any instant, the electric motor delivers the power which is just necessary for ensuring a perfect winding of the film, under a constant tension. Consequently, the energy consumption is considerably reduced and a perfectly wound exposed film is obtained as the well wound spool is stretched uniformly and consequently does not go askew and does not rub on its edges.

According to another feature of the present invention, the moving picture camera is provided with means for determining, from the signal representing the speed of rotation of the take-up roll, firstly the radius of the take-up spool formed on this roll, then from this radius, the length of film unwound and/or the lapse of time from the beginning of shooting.

Similar means, associated with the feed roll, also makes it possible to determine, at any instant, the radius of the feed spool and from this measurement the length of film which is still to be unwound, and also the time available up to the end of unwinding of the film.

According to a further feature of the present invention, means are provided for controlling the speed of drive of each sprocket wheel of the magazine by that of the main motor of the camera, so that the mean speed of each sprocket wheel is exactly equal to the mean speed imposed on the film by the claw driven by the main motor.

As a safety measure, additional means are provided to compensate a possible deformation of the loop with respect to its correct position.

In the moving picture camera according to the invention, the loop of film inside the magazine is formed automatically and is maintained in its correct position by suitable means provided inside the magazine. Consequently, there is virtually no more energy to be contributed from the actual body of the camera for driving the film. The functionning of the camera is particularly quiet, and the film is not stretched excessively at the start. This results in much less noise upon passage on the sprocket wheels, less tension exerted thereon and a reduction of friction.

BRIEF DESCRIPTION OF DRAWINGS

The invention will be more readily understood on reading the following description with reference to the accompanying drawings, in which.

DESCRIPTION OF THE PREFERRED EMBODIMENT

Figure 1:
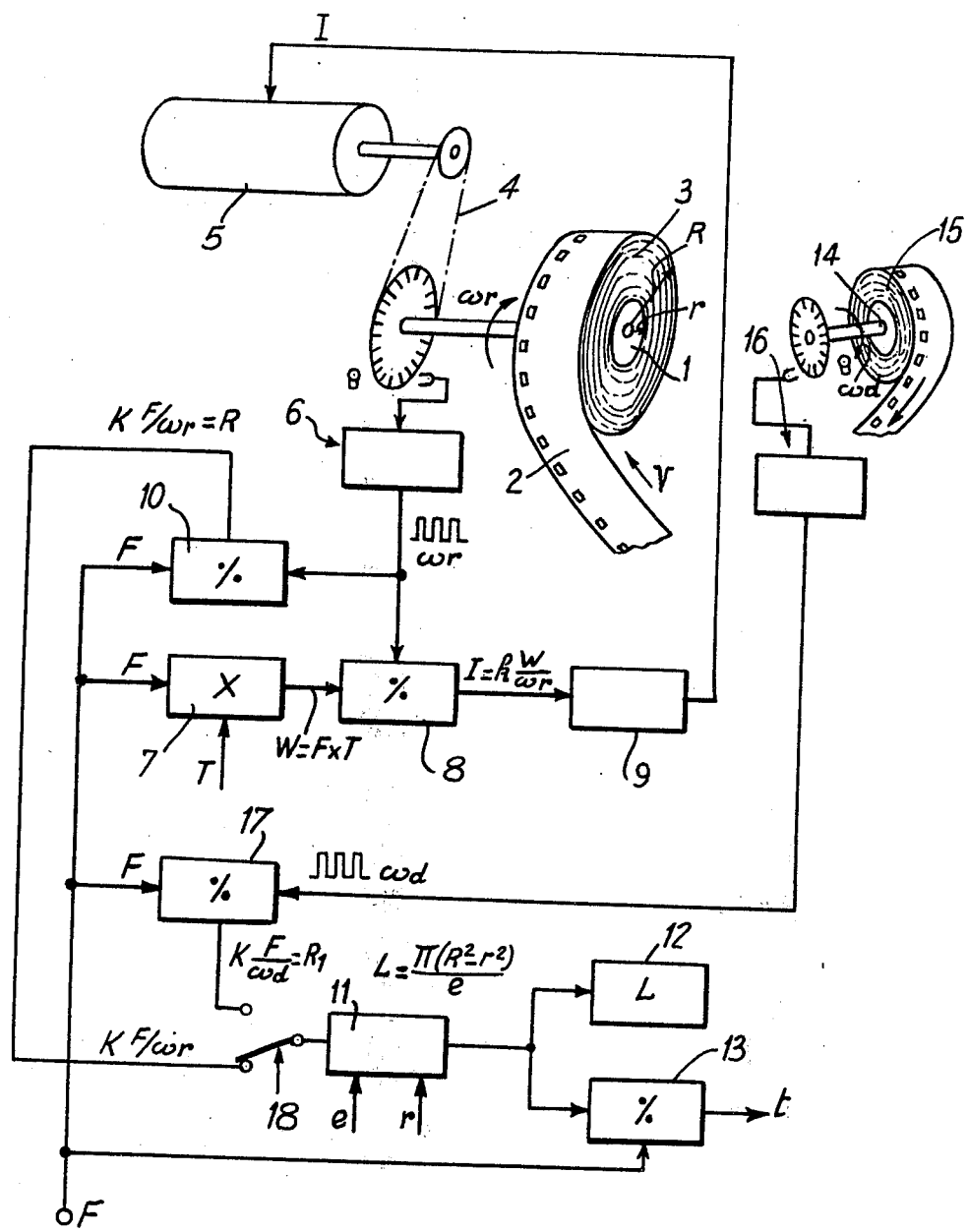
FIG. 1 is a block diagram of the electrical device for driving the take-up roll of an interchangeable magazine of a moving picture camera according to the invention.

Referring now to the drawings, FIG. 1 shows a roll 1 of an interchangeable magazine of a moving picture camera, on which roll is wound, at each instant, a certain length of a film 2 on which an image has been made, constituting a take-up spool 3. Said roll is rotated, via a connecting device 4, by an electric motor 5 which is incorporated in the interchangeable magazine of the camera.

A first tachometric pick-up 6 is provided to measure, at any instant, the speed of rotation $\omega_r$ of the take-up roll 1. This tachometric pick-up 6 may be, for example, of the photoelectric type and it may then comprise a disc coupled to the spindle of the roll 1, this disc being pierced with regularly spaced radial slots, distributed in a ring, these slots moving between, on the one hand, a light source and, on the other hand, a photoelectric cell forming part of the pick-up 6. This pick-up 6 thus delivers at its output a pulse signal $\omega_r$ of which the frequency is proportional to the speed of rotation of the take-up roll 1.

This signal $\omega_r$ is used, according to the invention, for several purposes and particularly for determining the electric current which must be supplied to the motor 5 for the useful electric power, in other words the mechanical power supplied to the drive spindle of the take-up roll 1, to be maintained constant, for a selected image cadence.

If V is the linear speed of the film 2, which speed depends on the image cadence F selected by the operator, and T is the given tension of the film 2 which is necessary for the turns to be contigous one wound, the mechanical power W which must be suppled by the motor 5 is equal to $W = V \times T$. This power W must therefore be constant since V and T are, in determined conditions of functioning, constants. Now, the mechanical power W is in fact equal to the useful electric power supplied by the motor 5, which is equal to the product of the intensity of the supply current I of this motor by the counter electromotive force or the speed of rotation thereof.

In order thus to determine the intensity I of the electric current supplying the motor 5, the moving picture camera comprises a computer comprising a multiplier stage 7 which receives at its two inputs on the one hand a signal F (digital or analog) representing the selected image cadence and, on the other hand, a signal T (analog or digital) representing the desired tension for the film. The multiplier stage 7 thus delivers at its output a signal $W = F \times T$ which represents the constant mechanical power W having to be supplied by the electric motor 5. This signal W is applied to the "dividend" input of a divider stage 8 which receives at its other "divisor" input the signal $\omega_r$ representing the speed of the take-up roll 1, in other words the speed of rotation of the motor 5. The divider stage 8 delivers at its output a signal $I = k(W/\omega_r)$ which corresponds to the intensity of the electric current having to be supplied to the motor 5 for the useful electric power furnished to be constant at any instant. The signal I may be an analog signal applied directly to the motor 5 or a digital signal which is applied to this motor via a digital/analog converter 9.

In this way, the electric motor 5 receives at any instant a current of adapted electrical intensity and it supplies the power which is just necessary for driving the roll 1, whatever the conditions of winding.

As indicated previously, use may be made, for measuring the speed of rotation of the electric motor 5 and the take-up roll 1, not only of a tachometric pick-up 6 but of any circuit enabling the counter electromotive force of the motor to be measured directly at a given instant.

According to the invention, the signal $\omega_r$ representing the speed of rotation of the electric motor 5 may also be used for determining the radius R of the spool 3 of film formed on the take-up roll 1, in other words the length of film delivered and/or the lapse of time from the beginning of shooting with the magazine used.

The radius R may easily be determined from the equation: $KF = V = R\omega_r$. In other words, $R = K(F/\omega_r)$. For calculating R, the moving picture camera comprises a stage 10 which receives at its dividend input the signal F corresponding to the image cadence and at its divisor input the signal $\omega_r$ corresponding to the speed of rotation of the motor 5 and of the take-up roll 1. The divider stage 10 delivers at its output a signal $R = K(F/\omega_r)$ which is applied to an input of a calculating circuit 11. This circuit makes it possible to calculate the length L of the film constituting the take-up spool 3 wound on the take-up roll 1, from the equation:

$$L = \frac{\pi(R^2 - r^2)}{e}$$

in which e is the thickness of the film 2 and r the radius of the take-up roll 1. The output of the calculating circuit 11 is connected on the one hand to a display device 12 displaying the length L unwound and on the other hand to the dividend input of a divider stage 13 receiving at its divisor input the signal F representing the image cadence. This divider stage 13 therefore delivers at its output a signal t which represents the time lapsed since the beginning of shooting.

If desired, the moving picture camera may also comprise a similar circuit associated with the feed roll 14 on which a feed spool 15 of radius $R_1$ is always present, at a given instant. This feed roll 14 is rotated at an angular speed $\omega_d$ which is variable as a function of the length of film unwound. With this roll 14 is associated a tachometric pick-up 16 which delivers at its output a signal $\omega_d$ representing the speed of rotation of the feed roll 14. This signal is applied to the divisor input of a divider stage 17 receiving at its dividend input the signal F of the image cadence. At its output, this divider stage 17 emits a signal $K \times (F/\omega_d) = R_1$ which represents the radius of the speed spool 15. This signal may be applied, via a two-position switch 18, connected between the divider 10 and the calculating 11, to the input of the said calculating circuit 11, in place of the output signal of the divider stage 10. Under these conditions, the calculating circuit 11 determines the length L of the film still to be unwound and constituting the feed spool 15, whilst the divider stage 13 gives the time still available to the end of the spool.

Figure 2:
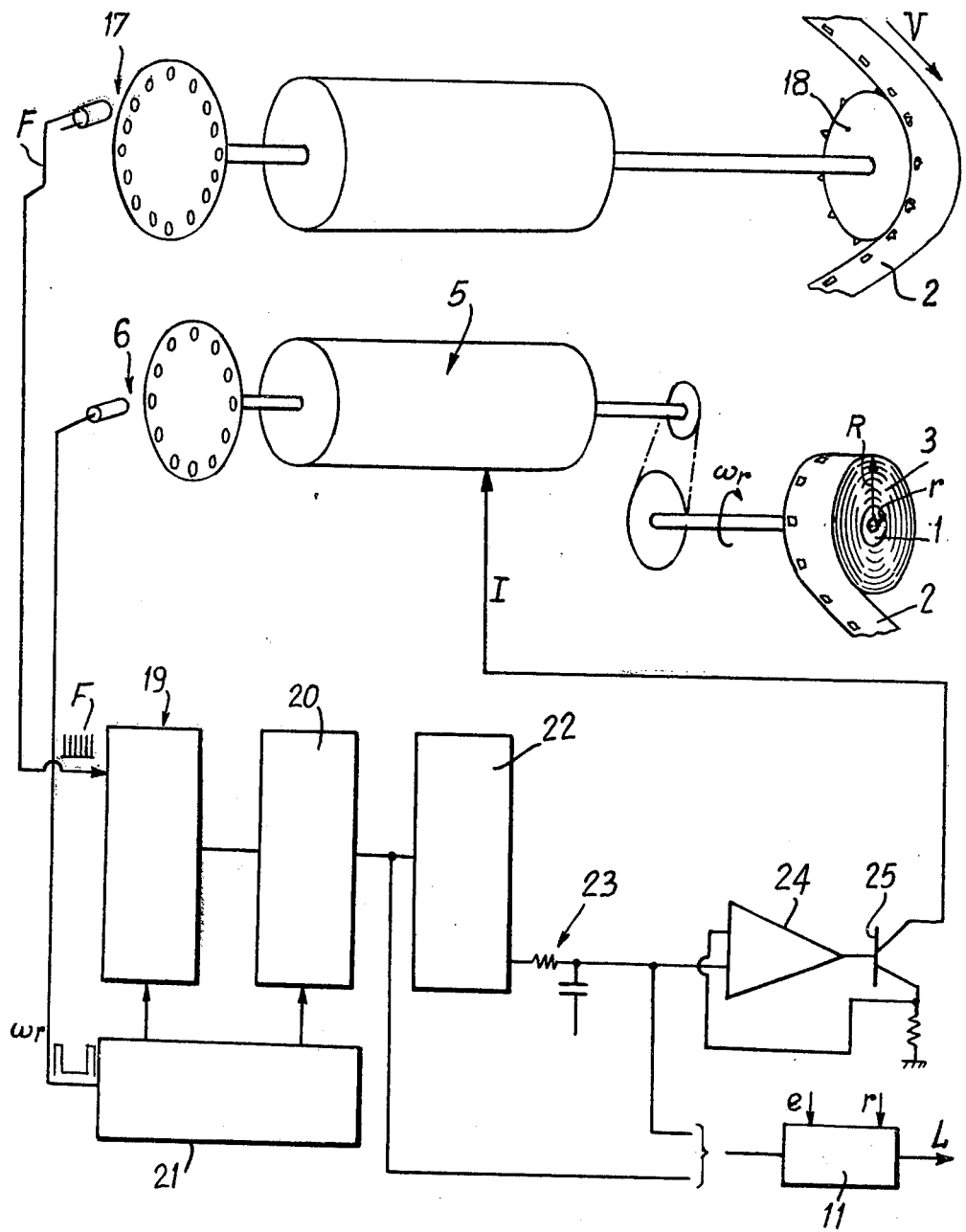
FIG. 2 is a diagram of an embodiment of the calculating means for determining the intensity of the electric current having to be supplied to the motor.

FIG. 2 shows by way of illustrative and non-limiting example, a particular embodiment of the circuits, of which the block diagram is shown in FIG. 1. In this embodiment, the signal F representing the image cadence is delivered by a tachometric pick-up 17 driven in synchronism with a sprocket wheel 18 of the film 2. The tachometric pick-up 17 delivers a pulse signal having a frequency proportional to the speed V of the film 2. The signal $\omega_r$ representing the speed of rotation of the motor 5 and that of the take-up roll 1 is also of the pulse type and it is delivered by the tachometric pick-up 6. The signal F is applied to the input of a counter 19 of sufficient capacity to measure the number of pulses of the signal F, which are emitted by the tachometric pick-up 17, during a period of the signal $\omega_r$, i.e. during the time gap separating two pulses of this signal. The counter 19 is connected to a memory 20 of the same capacity and to a synchronization circuit 21 receiving at its input the signal $\omega_r$. Upon each pulse of the signal $\omega_r$ emitted by the tachometric pick-up 6, the synchronisation circuit 21 controls the transfer of the contents of counter 19 into the memory 20, then ensures the return to zero of this counter which is ready for a new measurement.

The memory 20 contains the number $F/\omega_r$ which is proportional to the radius R of the take-up spool 3. This number is applied to a digital/analog converter 22 which converts the digital value applied to its input into an analog signal of voltage filtered by a circuit 23. This voltage thus filtered is applied to the input of an amplifier 24 of which the output controls a transistor 25 connected to the electric motor 5 and functioning as a rheostat to vary the intensity of the supply current of this motor.

For determining the length L, either the output signal of the memory 20 may be applied to the input of the calculating circuit 11, if this calculating circuit is of the digital type, or the analog output signal of the converter 22 if the calculating circuit 11 is of the analog type.

Figure 3:
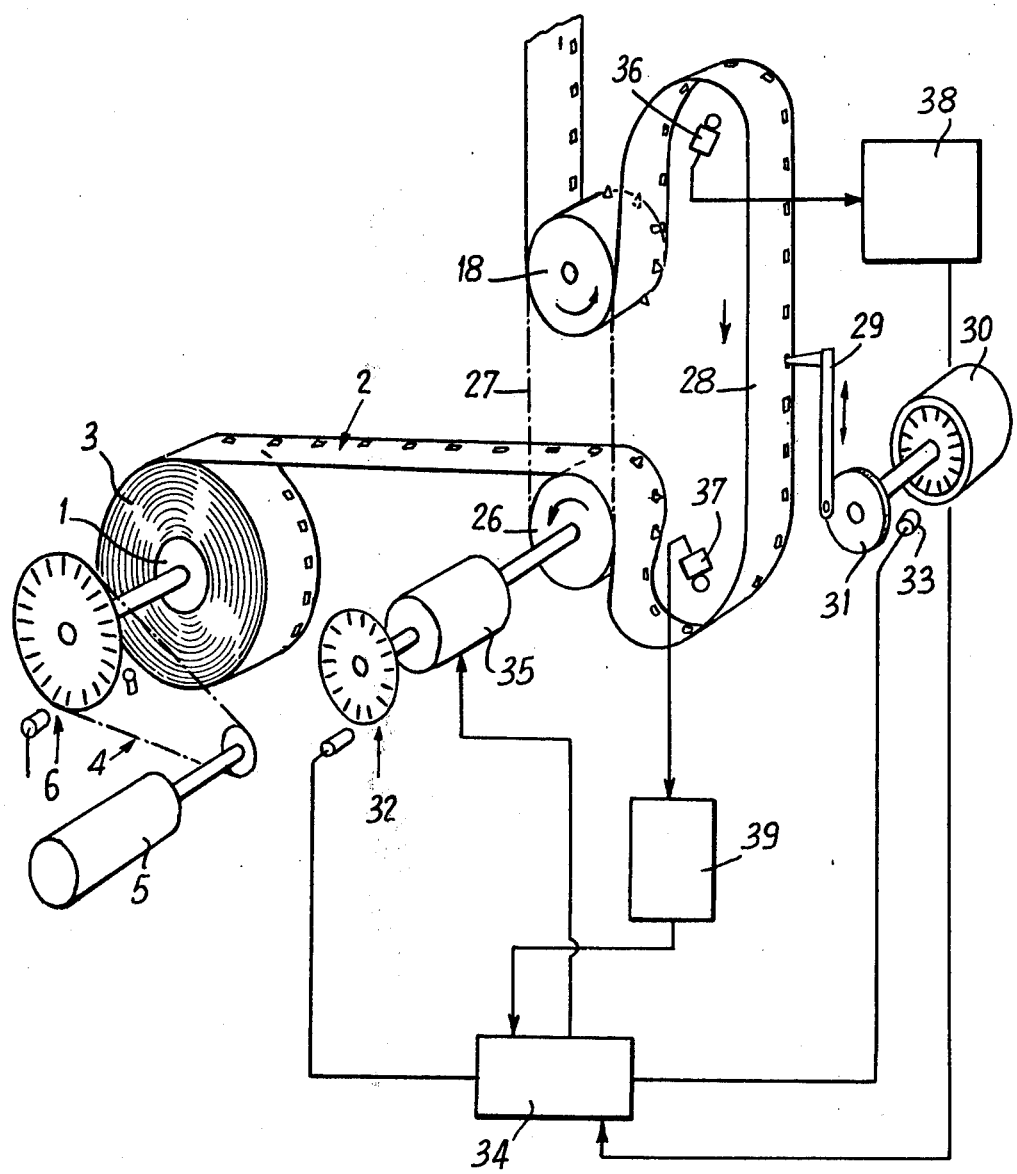
FIG. 3 is a diagram of the servo-system of each sprocket wheel of the interchangeable magazine.

Referring more particularly to FIG. 3, the device will now be described which makes it possible always to maintain a loop of film in a correct position inside the magazine of the camera. Inside this magazine, the film 2 passes over one or two sprocket wheels 18, 26 rotated in sychronism and coupled together by a connecting member such as a notched endless belt 27. The two sprocket wheels 18, 26 may be rotated by the film 2 itself, wound on the roll 1 driven by the electric motor 5, or they may be driven directly from this motor, via a connecting device. In the case illustrated in FIG. 3, the lower sprocket wheel 26 is driven by the film 2 and it transmits its movement to the top sprocket wheel 18 via the notched belt 27. The film 2 usually forms, inside the magazine, a loop 28 and it moves in front of the shot-taking gate of the plate of the camera. The intermittent advance movement of the film is ensured by a claw 29, located in the main body of the camera, which is animated by a reciprocating vertical movement and which engages with the successive perforations of the film. This claw 29 is driven in manner known per se, from the main motor 30 located in the main body of the camera, via a mechanism converting the movement of continuous rotation of the motor 30 into a movement of reciprocating translation, for example a mechanism 31 of the crank-connecting rod system type.

For good operation of the camera, it is important that the loop 28 is permanently maintained in a correct position. As the claw 29 drives the film 2 at constant speed, which depends on the image cadence selected, the quantity of film supplied by the top sprocket wheel 18 and taken by the lower sprocket wheel 26 must, in order that the loop 28 remains in correct position, be equal to the quantity of film which the claw 29 descends at each cycle. In other words, the average speed of each sprocket wheel 18, 26 must be exactly identical to the average speed of advance imposed by the claw 29.

To measure these speeds, a first tachometric pick-up 32 measuring the speed of sprocket wheels 18, 26 and a second tachometric pick-up 33 measuring the speed of the main motor 30 of the camera are respectively used, these two tachometric pick-ups 32, 33 being respectively connected to the two inputs of a speed comparator 34. This comparator delivers at its output an error signal which is applied to a friction coupler or to an electromagnetic brake 35 controlling the speed of rotation of the sprocket wheels 18 and 26.

If the average speed of the claw 29 becomes higher than that of sprocket wheels 18 and 26, the loop 28 tends to move downwardly, but the comparator 34 immediately detects the difference between the two speeds and it acts on the friction coupler or the electromagnetic brake 35 to accelerate the sprocket wheels 18 and 26 a little, so as to cause the loop 28 to rise and to return it into its correct position.

If the loop 28 tends, on the contrary, to rise, this means that the claw 29 is driving the film less quickly than the sprocket wheels 18, 26, and the friction coupler or the electromagnetic brake 35 intervenes in reverse direction to decelerate the sprocket wheels 18 and 26 and to cause the loop 28 to descend. The open servo-control loop which has just been described therefore enables the film 2 to be permanently maintained in correct position in the magazine. However, it may happen that the loop 28 is deformed by accident, for example if the claw 29 misses one or two perforations to drive the film, so that the lower sprocket wheel 26 which continues to drive the film, provokes a shortening of the lower part of the loop.

Safety means must therefore be additionally provided, to overcome these possible failures.

These safety means comprise two pick-ups, an upper one, 36, and a lower one, 37, located respectively in the immediate vicinity of the upper and lower curved parts of the loop so as to be actuated as soon as this loop is deformed in one direction or the other.

The pick-ups 36,37 are connected to respective circuits 38,39 which are themselves connected to the speed comparator 34. The circuits 38, 39 are provided to emit electric signals, applied to the comparator 34, for this latter to emit, in turn, according to the case, a signal transmitted to the friction coupler or to the electromagnetic brake 35, so that said latter slows down or accelerates the sprocket wheels 18, 26. The circuits 38,39 may be made so as to control a compensation of length of the film 2, in advance or delayed, corresponding to a predetermined number of steps of the film, for example to one or two perforations.

The pick-ups 36,37 may be placed inside the loop 28, as shown in FIG. 3, or outside it.

What is claimed is:

1. A moving picture camera with interchangeable film magazine comprising, in the actual body of the camera, a claw for advancing the film, and a main motor driving this claw in a reciprocating movement; and, in each magazine, a take-up roll on which the exposed film is wound, an auxiliary electric motor rotating this take-up roll and at least one sprocket wheel for regularly advancing the film, the film being formed into a loop near the claw having two short end parts under control of the sprocket wheel, a friction coupler or an electromagnetic brake acting on the drive of the sprocket wheel, first means for measuring the speed of the sprocket wheel; second means for measuring the speed of the main motor of the camera and a speed comparator with two inputs respectively connected to the first and second measuring means and of which the output is connected to the friction coupler or electromagnetic brake so as to vary the speed of the sprocket wheel and to maintain the linear speed equal to the average speed of advance of the film driven along by the claw.

2. A moving picture camera according to claim 1, further comprising, in the immediate vicinity of the two short end parts of the loop formed by the film, two respective position pick-ups, and two associated electric circuits determining an advance or delay in the displacement of the film corresponding to a determined number of steps, these two circuits being respectively connected to the two position pick-ups and also to the speed comparator for accelerating or decelerating, via the friction coupler or electromagnetic brake, the sprocket wheel so as always to reestablish the loop in correct position.

* * * * *